United States Patent [19]

Gerber

[11] Patent Number: 4,984,492

[45] Date of Patent: Jan. 15, 1991

[54] CUTTING BLADE AND METHOD FOR CUTTING SHEET MATERIAL

[75] Inventor: Heinz J. Gerber, West Hartford, Conn.

[73] Assignee: Gerber Garment Technology, Inc., West Tolland, Conn.

[21] Appl. No.: 370,623

[22] Filed: Jun. 23, 1989

[51] Int. Cl.$^5$ ............................................. D06H 7/00
[52] U.S. Cl. ........................................ 83/697; 30/350; 30/357; 76/101.1; 83/701; 83/174.1
[58] Field of Search ........................... 76/101.1, 104.1; 30/273, 275, 349, 350; 83/174, 174.1, 651, 697, 936, 941

[56] References Cited

U.S. PATENT DOCUMENTS

| 3,225,802 | 12/1965 | Engi | 83/174 |
|---|---|---|---|
| 3,681,846 | 8/1972 | Gerber | 30/355 |
| 3,882,749 | 5/1975 | Tourek | 83/174 X |
| 3,977,287 | 8/1976 | Beale | 83/697 |
| 4,133,236 | 1/1979 | Pearl | 83/174 |
| 4,574,673 | 3/1986 | Pearl | 83/697 |
| 4,653,373 | 3/1987 | Gerber | 83/697 |
| 4,732,064 | 3/1988 | Pearl | 83/13 |

Primary Examiner—W. Donald Bray
Attorney, Agent, or Firm—McCormick, Paulding & Huber

[57] ABSTRACT

In a reciprocating blade for cutting sheet material first and second side surfaces inclined relative to one another intersect to define an elongated cutting edge. The cutting edge is offset from a reference plane located midway between the side faces of the blade so that the first side surface passes through the reference plane in going from its associated side face to the cutting edge. At least the first side surface is covered with a thin coat of hard material harder than the base material of the blade. During use the second side surface is ground to cause the cutting edge to be defined by the hard material covering the first side surface. As a result of repeated sharpening grindings of the second side surface the cutting edge gradually moves to and then beyond the reference plane to give the blade a long useful service life.

4 Claims, 2 Drawing Sheets

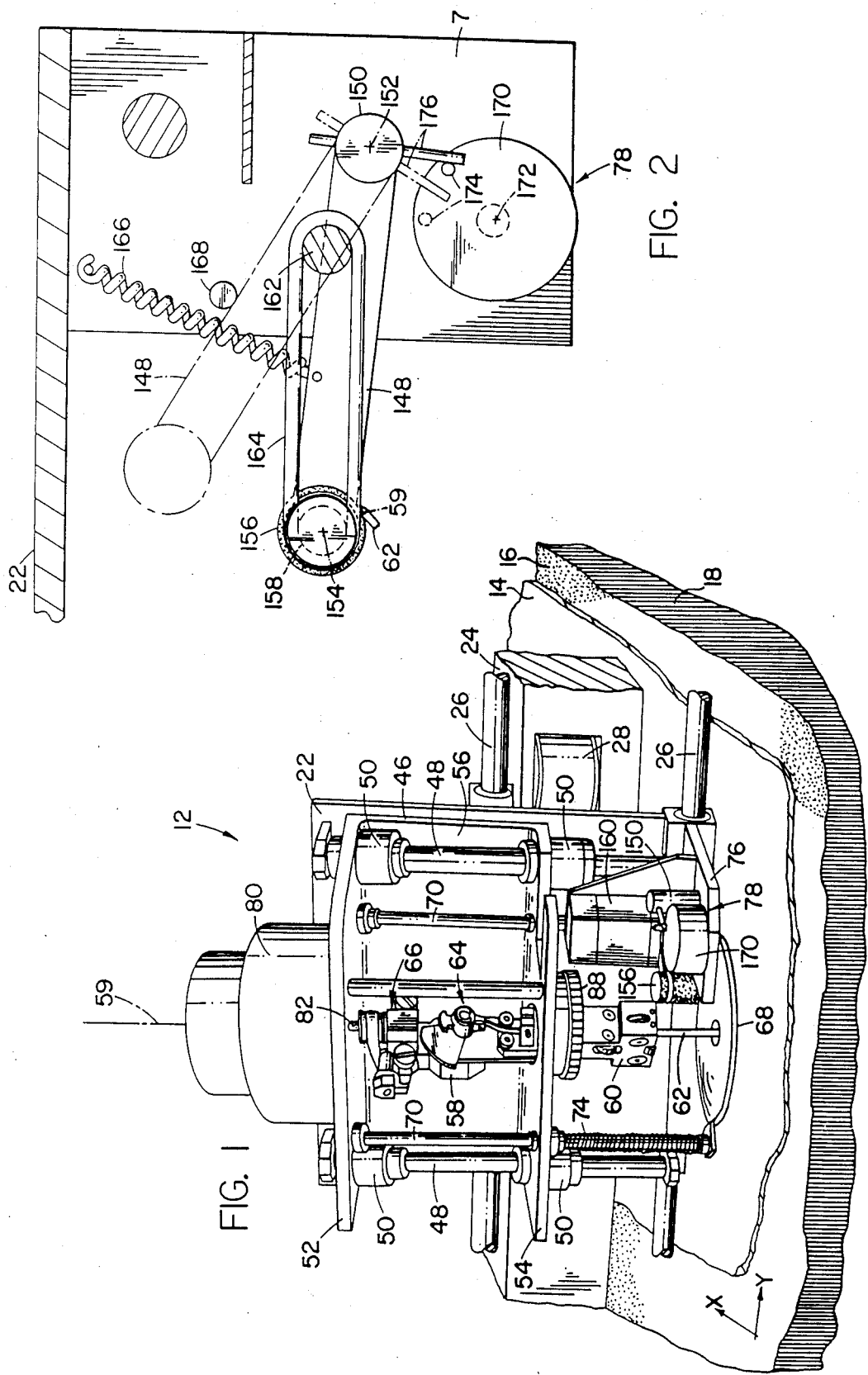

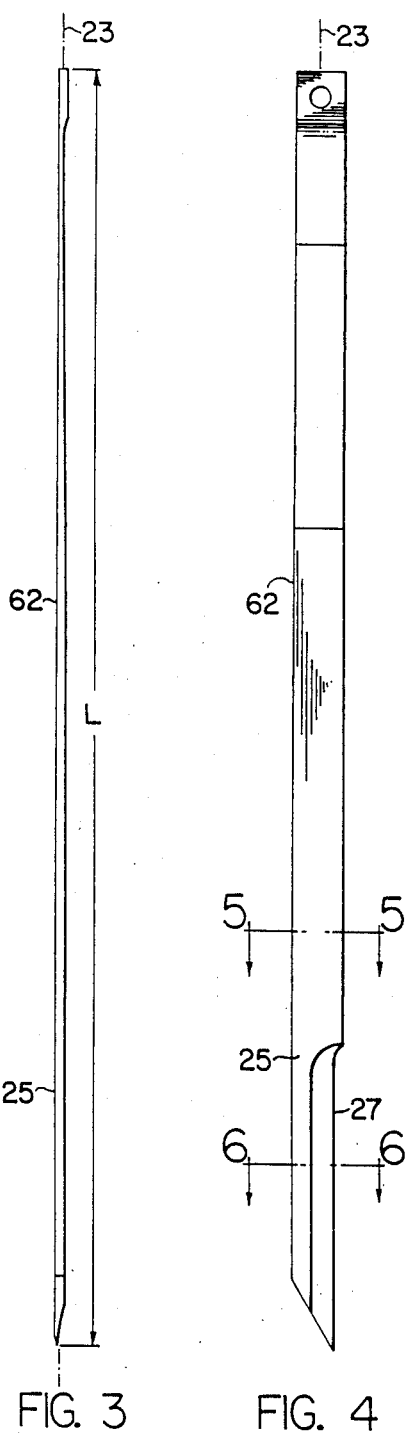
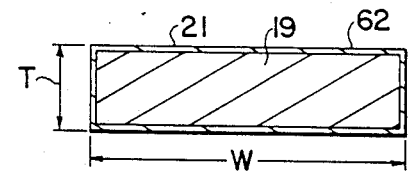
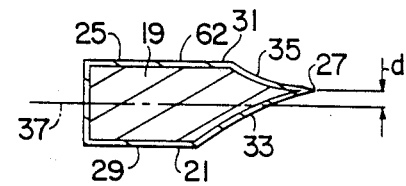
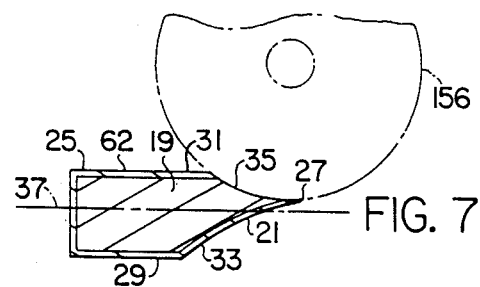
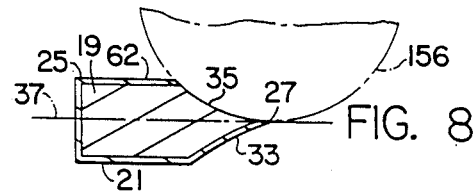
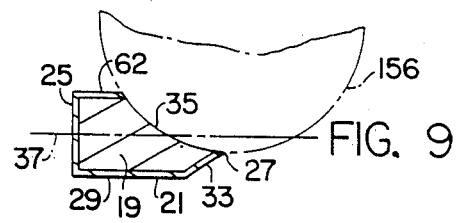
FIG. 3　FIG. 4　FIG. 5　FIG. 6　FIG. 7　FIG. 8　FIG. 9

CUTTING BLADE AND METHOD FOR CUTTING SHEET MATERIAL

RELATED APPLICATION

As to subject matter, this application is related to that of an application being filed concurrently herewith, by the same inventor as that of this application and entitled BLADE FOR CUTTING SHEET MATERIAL AND RELATED CUTTING METHOD, Ser. No. 370,649.

BACKGROUND OF THE INVENTION

This invention relates to the machine cutting of fabric or other sheet material, spread on a supporting surface, by means of a reciprocating cutter blade reciprocated along a reciprocation axis generally perpendicular to the sheet material while the blade is in cutting engagement with the material and moved forwardly along a desired line of cut, and deals more particularly with the construction of a blade used for such cutting and with a related method for using and sharpening the blade.

As to its construction the blade of this invention is of the general type shown by U S. Pat. No. 4,653,373 wherein the base material of the blade at least in the vicinity of the cutting edge is covered with a thin coating of hard material which after sharpening of the blade is located at and defines the cutting edge so as to make the cutting edge more enduring and wear resistant than if defined by the softer base material. The present invention involves an improvement of the basic blade construction shown by said patent and also involves an improvement in its method of use.

In cutting machines controlled by automatic controllers, the cutting edge of the cutting blade before use of the blade is located on a reference plane passing through the middle of the blade thickness and then, as the blade is used, during sharpening cycles both sides of the blade are ground to maintain the cutting edge on the reference plane. In the blade shown by the aforesaid patent, however, the cutting edge is initially approximately on the reference plane and then during use of the blade only one side of it is sharpened by grinding, so that as a result of repeated sharpenings the cutting edge gradually moves further and further away from the reference plane. The blade thus cuts with precise accuracy only when first installed in a cutting machine and gradually loses such precise accuracy during the course of its service life.

Further, the service life of the blade shown in the aforesaid patent is restricted by the fact that the blade can be used and sharpened only throughout the period during which the cutting edge moves from the reference plane to some limit of displacement from the reference plane.

The general object of this invention is therefore to provide an improved hard coated blade, and a related method of using the blade, whereby the blade is capable of cutting with acceptable accuracy throughout a much longer service life than the service life of previously known blades of the same general type.

Other objects and advantages of the invention will be apparent from the following description of a preferred embodiment of the invention and from the accompanying drawings and claims.

SUMMARY OF THE INVENTION

The invention resides in a blade for cutting sheet material spread on a supporting surface, and a related method for using the blade, wherein the blade before use has a cutting edge displaced to one side of a reference plane passing through the middle of the blade thickness. The cutting edge is defined by two intersecting side surfaces, the first one of which passes through the reference plane and the second one of which is sharpened during sharpening of the blade. The first surface is coated with a thin coating of hard material harder than the base material of the blade so that as the second surface is sharpened the cutting edge becomes defined substantially entirely by the hard material.

Because of the initial displacement of the cutting edge from the reference plane as the second surface is repeatedly sharpened the cutting edge moves gradually toward the reference plane and then to the other side of it. Preferably, the initial spacing to the cutting edge from the reference plane is such that when the blade is initially installed in a cutting machine, the machine will cut with an acceptable degree of accuracy. Then, as the blade is sharpened, its accuracy improves as the cutting edge moves toward the reference plane. After the cutting edge reaches the reference plane further sharpenings of the blade cause the cutting edge to move away from the reference plane until the edge reaches another limit of displacement, after which the blade may be discarded. Consequently, the blade is used both as the edge moves to the reference plane from an initial limit of displacement on one side of the reference plane and also as the edge moves from the reference plane to a final limit of displacement on the other side of the reference plane; whereas in the previously known blade of the above mentioned patent, the blade is used only during the period of its cutting edge moving from the reference plane to the final limit of acceptable displacement.

In many instances the blade may be so thin and/or the cutting accuracy requirements of the job at hand may be so wide that acceptable cutting accuracy is achieved with the cutting edge located at any point between the two planes containing the side faces of the blade. In such cases the maximum acceptable cutting error does not establish a limit displacement of the cutting edge from either side of the reference plane, but such limit displacements nevertheless exist for some other reason, such as the spacing of each side face of the blade from the reference plane. The invention applies to such instances as well as to ones where the displacement limits are defined by a specific maximum amount of tolerable cutting error.

BRIEF DESCRIPTION OF THE DRAWINGS

FIG. 1 is a fragmentary perspective view of a cutting machine using a cutting blade embodying the present invention.

FIG. 2 is a plan view of the sharpening mechanism of the FIG. 1 machine.

FIG. 3 is a rear view of the blade of FIG. 1.

FIG. 4 is a side view of the blade of FIG. 1.

FIG. 5 is a transverse sectional view taken on the line 5—5 of FIG. 4.

FIGS. 6, 7, 8 and 9 are transverse sectional views taken on the line 6—6 of FIG. 4 and showing the blade at successive different points in its service life.

DETAILED DESCRIPTION OF THE PREFERRED EMBODIMENT

For the purposes of this description the blade of the invention is taken to be a blade of substantially the same size and shape as that shown in pending U.S. Patent Application Ser. No. 06/861,148 filed May 8, 1986 and entitled CUTTER HEAD AND KNIFE FOR CUTTING SHEET MATERIAL now, U.S. Pat. No. 4,841,822, and the cutting machine with which the blade is used is taken to be generally similar to the cutting machine shown by that application. Reference is accordingly made to said application for further details of the construction of the associated cutting machine.

For the present purposes, it is sufficient to note that in the accompanying drawings a blade embodying the invention is shown at 62 and is illustrated in use with a cutting head 12 of a sheet material cutting machine for cutting fabric or similar sheet material to be cut, as indicated at 14, supported by a supporting surface 16 provided by a bed 18 comprised of a large number of relatively closely packed vertically extending bristles having their upper ends located in and defining the support surface 16. The support surface 16 is therefore penetrable by the lower end of the blade 62 as it cuts the material 14. The material 14 may consist of a single layer of sheet material or may be a lay-up of a plurality of sheets spread on top of one another.

In FIG. 1, the cutting blade 62 is shown in a raised non-cutting position. For cutting the material 14 the blade is moved downwardly from this raised position into cutting engagement with the material 14 and is reciprocated along a generally vertical reciprocation axis, perpendicular to the plane of the material 14, While it is moved along a desired line of cut by appropriate movement of the head 12 in the illustrated X and Y coordinate directions.

Part of the cutter head 12 is a tool carriage 22 supported on an X carriage 24 by two guide bars 26, 26 for movement in the illustrated Y coordinate direction. Such movement is effected by a drive belt 28 fastened to the tool carriage 22 and passing over pulleys at opposite ends of the carriage 24, one of which is powered by a suitable drive motor. At each of its opposite ends, the X carriage 24 is guided for movement relative to the surface 16 in the X coordinate direction and is driven in such direction by an associated drive mechanism (not shown).

As seen in FIG. 1, the cutter head 12 also includes a base frame 46 supported for vertical movement relative to the carriage 22 by two vertical guide rods 48 48 fixed to the carriage by slide bearings 50, 50 fixed to the base frame and slideably receiving the rods 48, 48. In FIG. 1, the base frame 46 is shown in its raised or non-cutting position relative to the tool carriage 12. A pneumatic actuator (not shown) or similar motor moves the base frame between its lowered and raised positions. The base frame 46 is basically a U-shaped member having an upper horizontal wall 52, a lower horizontal wall 54 and a vertical wall 56.

A blade frame 58 is carried by the base frame 46 for rotation relative to the base frame about a vertical theta axis 59. The blade frame 58 in turn carries a guide 60 for the blade 62, a reciprocating mechanism 64 and the major part of the drive mechanism 66 for the reciprocating mechanism 64.

Also carried by the base frame 46 is a presser foot 68 attached to the lower ends of two vertical rods 70, 70. The rods 70, 70 are vertically slideable relative to the two horizontal walls 52 and 54 of the base frame and are limited in their downward movement relative to the base frame by a suitable stop at the upper end of each rod. A helical compression spring 74 surrounds the lower portion of each rod 70 and urges the rods and the presser foot 68 downwardly relative to the base frame When the base frame is in its raised position as shown in FIG. 1, the presser foot 68 and the rods 70, 70 are in their lowermost positions with the presser foot nevertheless being raised above the surface of the underlying sheet material 14 to be cut. As the base frame is moved from its raised position to its lower cutting position the presser foot 68 is brought into engagement with the surface of the material 14 before the base frame reaches the lowermost limit of its movement and thereafter continued downward of the base frame causes the springs 74, 74 to be compressed causing the presser foot to exert a pressing force on the material 14.

For sharpening the blade 62, the tool carriage 22 has a horizontally extending wall portion 76 located below the bottom wall 54 of the base frame and supporting a sharpening mechanism, indicated generally at 78 in FIG. 1, operable to sharpen the blade 62, as explained in more detail hereinafter, when the base frame is in its non-cutting position as shown in FIG. 1.

The motor for driving the blade 62 in its reciprocating motion is indicated at 80. This motor is fixed to the base frame 46 while the reciprocating mechanism 64 rotates with the blade 62 about the theta axis 59. The output drive shaft of the motor 80 is shown at 82 and a suitable drive mechanism is provided between this shaft and the input shaft of the reciprocating mechanism 64 to permit rotation of the reciprocating mechanism about the theta axis. While power is delivered to it by the motor 80 for reciprocating the cutting blade. Attached to the blade frame 58 below the horizontal wall 54 is a gear wheel 8 driven through a suitable gear train by an associated motor (not shown) to control the positioning of the blade frame 58 about the theta axis.

Turning to FIG. 2, and considering it along with FIG. the sharpening mechanism 78 includes a sharpener arm 148 rigidly fixed to a hub 150 supported for rotation relative to the tool carriage wall 76 about a first vertical axis 152. Supported on the other end of the arm 148 for rotation relative to it about a second vertical axis 154 is a sharpening wheel 156 consisting of a body having a drive groove 158 intermediate its top and bottom ends and an abrasive grit bonded to the outer surface of the body. The sharpening wheel is driven in rotation about the second vertical axis 154 by a motor 160 through a pulley 162 and an O-ring drive belt 164 engaging the wheel's groove 158. A tension spring 166 normally holds the arm 148 in a retracted position against a stop 168 as shown by the broken lines of FIG. 2. From this position, the arm is moveable to an active sharpening position as shown by the solid lines of FIG. 2, at which the sharpening wheel is brought into engagement with the cutter blade 62. For effecting this movement of the arm 148, the sharpening mechanism 78 includes a rotary electrical solenoid actuator 170 having an output member rotatable about a vertical axis 172 and carrying a vertically extending pin 174. When the actuator is de-energized the pin 174 is biased by an internal spring to the position shown by the broken lines in FIG. 2. When the solenoid is energized, the pin rotates clockwise about the axis 172, as seen in FIG. 2, from the broken line position to the full line position and in the course of this moment engages a horizontal pin 176 fixed to the hub 150 thereby rotating the sharpener arm 148 from its retracted to its active position.

In the course of a sharpening cycle, the base frame 46 is first raised relative to the tool carriage 22 to its non-cutting position to bring the part of the blade which projects downwardly out of the guide 60 to the vertical level of the sharpening wheel 156. The blade is then rotated to the proper position about the theta axis for sharpening and the sharpening wheel is then brought into contact with it by swinging of its arm 148. During the sharpening, the blade is reciprocated, preferably at a lower stroking speed then used for cutting the sheet material 14, so that the sharpening wheel engages and sharpens the full extent of the cutting portion of the blade. The body of the wheel is generally cylindrical, although is also preferably slightly conical, the upper end being of slightly smaller diameter than the bottom end to accommodate bending of the blade which occurs as the wheel is pressed against it and to thereby cause the wheel to exert a substantially uniform sharpening effect on the blade along the entire length of the blade engaged by the wheel.

The sharpening cycles used with the cutting blade 62 are controlled by the controller (not shown) associated with the cutting machine so that as the cutting process progresses the blade is sharpened at periodic intervals to keep its cutting edge in a sharp condition. For example, the controller may be programmed to cause the mechanism to execute a sharpening cycle each time the cutting blade has cut a predetermined length of material following the preceding sharpening cycle or, as another example, a sensor may be provided to sense the rearward force imposed on the cutting blade 62 by the material 14 and the controller programmed to initiate a new sharpening cycle each time the sensed rearward force reaches a pre-determined value.

Turning now to FIGS. 3 to 9, in accordance with the invention the blade 62 consists of a piece 19 of base material coated at least partially with a thin coating 21 of hard material harder than the material of the piece 19. The materials chosen for the piece 19 and the coating 21 may vary widely, but in a preferred case the material of the base piece 19 is steel. Such as M-2 steel, and the material of the coat 21 is titanium nitride. The titanium nitride or other material of the coat 21 is preferably applied to the base piece 19 by vapor deposition and has a thickness of less than 0.001 inch, the thickness preferably being in the range of 0.0001 to 0.0002 inch. The thickness of the coat 21 is in any event very much smaller than the dimensions of the base piece 19, and therefore the basic shape and dimensions of the entire blade 62 are determined by and essentially similar to that of the base piece 19.

As seen in FIGS. 3 and 4, the blade 62 is elongated along a longitudinal axis 23, which may also be its axis of reciprocation and has a lower cutting portion 25. The actual shape and size of the blade may vary widely without departing from the invention, but by way of example in the illustrated case the blade 62 is taken to be one having a length L of approximately 5¼ inch, a width W of approximately 0.200 inch and a thickness T of approximately 0.036 inch.

FIGS. 3, 4 and 6 illustrate the cutting portion 25 of the blade 62 as it appears after the manufacture of the blade has been completed and before the blade has been put into use. As seen in these figures, the cutting portion 25 has an elongated forward cutting edge 27 extending parallel to the longitudinal axis 23. Rearwardly of the cutting edge 27 are two parallel flat side faces 29 and 31, and forwardly of these side faces are first and second side surfaces 33 and 35 which are inclined relative to one another and which intersect to define the cutting edge 27, the first side surface 33 extending from the side face 29 to the cutting edge 27 and the second side surface 35 extending from the side surface 31 to the edge 27. As can be seen in FIG. 6, the arrangement of the first and second side surfaces 33 and 35 is such that the cutting edge 27 of the unused blade is laterally off-set by a distance d from a reference plane 37 located mid-way between and parallel to the planes of the side faces 29 and 31. The surfaces 33 and 35 may be either flat or slightly convex (hollow ground).

In the embodiment shown in FIGS. 5 thru 9, the base piece 19 is substantially entirely covered by the coat 21 of hard material. Therefore, when the blade is installed in a cutting head and the second surface 35 is first sharpened, the coat 21 of hard material initially covering the second surface 35 is removed as shown in FIG. 7, so that the portion of the coat 21 overlying the first surface 33 defines the cutting edge 27. Then as cutting progresses, the second surface 35, during periodic sharpening cycles, is ground to renew as needed the sharpness of the edge 27. During each sharpening cycle some base material is removed from the surface 35 so as a result the cutting edge 27 gradually moves closer to the reference plane 37 until reaching the point shown in FIG. 8 at which the edge 27 coincides with the reference plane. Thereafter, further sharpenings of the blade, by grinding the second surface 35, causes the cutting edge 27 to pass to the opposite side of the reference plane 37 and to gradually move away from the reference plane. Also, since the grinding wheel 156 is basically cylindrical it gives the surface a slightly convex or hollow ground shape.

Therefore, in comparison with a previous blade, such as shown by prior U.S. Pat. No. 4,653,373, wherein the cutting edge of the new unused blade lies approximately on a middle reference plane, it will be evident from FIGS. 6 to 9 that the initial lateral off-set d of the cutting edge from the reference plane 37 provides the blade with a greatly increased service life.

In FIG. 6, the second surface 35 of the unused blade is shown to be inclined relative to the associated side face 31 so that the displacemement of the cutting edge 27 is less than half the thickness of the blade. This, however, is not essential to the invention and if desired, and if compatible with the maximum permissible cutting error, in the unused blade the second surface 35 may be made co-planar with the side face 31 so as to give the cutting edge 27 an initial displacement d from the reference plane equal to one-half the thickness of the blade. Likewise, in some instances, if desired, the second surface 35 of the blade may continue to be ground beyond the point shown in FIG. 9 until the inclined surface 33 disappears and the cutting edge 27 becomes located in the plane of the side face 29.

It will also be understood that, in keeping with the invention, it is not essential to have all of the surfaces of the base piece 19 covered with the coating 21 of hard material. Instead, it is sufficient if only the first side surface 33 is covered with such hard material in the unused condition of the blade.

I claim:

1. A blade for a sheet material cutting machine, said blade prior to use comprising:

a piece of base material having an elongated cutting portion extending along a longitudinal axis and having a forward cutting edge parallel to said longitudinal axis, said cutting portion having two generally flat rear side faces located respectively in first and second spaced parallel planes and which side faces are located rearwardly of said cutting edge, and first and second forward side surfaces, said first and second forward side surfaces each extending forwardly from a respective one of said rear side faces and said first and second forward side surfaces being inclined relative to one another, as seen in a plane perpendicular to said longitudinal axis, and intersecting one another to define said cutting edge at their line of intersection, said cutting edge being located between said first and second planes and being laterally displaced from a reference plane located parallel to and mid-way between said first and second planes so that said first forward side surface passes through said reference plane, and a thin coating of hard material harder than said base material covering at least said first forward side surface of said cutting portion of said base material so that by a sharpening grinding of said second side surface said cutting edge can be made to be defined substantially entirely by said hard material, and whereby as a result of repeated sharpening grindings of said second side surface said cutting edge gradually moves toward and eventually to the other side of said reference plane.

2. A blade as defined in claim 1 further characterized by substantially all of said cutting portion of said piece of base material being covered by said thin coating of hard material.

3. A blade as defined in claim 1 further characterized by said base material being steel and said hard material being titanium nitride.

4. A blade as defined in claim 1 further characterized by said thin coating of hard material having a thickness of less than 0.001 of an inch.

* * * * *

UNITED STATES PATENT AND TRADEMARK OFFICE
CERTIFICATE OF CORRECTION

PATENT NO. : 4,984,492
DATED : January 15, 1991
INVENTOR(S) : Heinz Joseph Gerber It is certified that error appears in the above-identified patent and that said Letters Patent is hereby corrected as shown below:

Column 1
    Line 25, delete "Fat." and substitute--Pat.--.
    Line 60, delete "." and substitute--,--.

Column 2
    Line 42, delete "achieVed" and substitute--achieved--.

Column 3
    Line 35, delete "While" and substitute--while--.
    Line 51, delete "48 48" and substitute--48,48--.

Column 4
    Line 7, after "frame" insert--.--.
    Line 42, after "FIG." insert--1--.

Column 6
    Line 15, delete "Slightly" and substitute--slightly--.
    Line 47, delete "displacemented" and substitute--displacement d--.

Signed and Sealed this

Twenty-sixth Day of May, 1992

Attest:

DOUGLAS B. COMER

*Attesting Officer*      *Acting Commissioner of Patents and Trademarks*